(12) United States Patent
Zhang et al.

(10) Patent No.: US 8,355,607 B2
(45) Date of Patent: Jan. 15, 2013

(54) FIBER OPTIC ROTARY JOINT MECHANISM

(75) Inventors: Hong Zhang, Pennington, NJ (US); Boying B. Zhang, Pennington, NJ (US)

(73) Assignee: Princetel Inc., Hamilton, NJ (US)

( * ) Notice: Subject to any disclaimer, the term of this patent is extended or adjusted under 35 U.S.C. 154(b) by 358 days.

(21) Appl. No.: 12/899,086

(22) Filed: Oct. 6, 2010

(65) Prior Publication Data

US 2012/0087624 A1 Apr. 12, 2012

(51) Int. Cl.
*G02B 6/26* (2006.01)
(52) U.S. Cl. .......................... 385/26; 475/338
(58) Field of Classification Search ............ 385/26; 475/338
See application file for complete search history.

(56) References Cited

U.S. PATENT DOCUMENTS

| 5,157,745 | A | 10/1992 | Ames |
| 5,371,814 | A | 12/1994 | Ames et al. |
| 5,442,721 | A | 8/1995 | Ames |
| 6,301,405 | B1 * | 10/2001 | Keil ............................... 385/25 |
| 7,239,776 | B2 * | 7/2007 | Oosterhuis et al. ............ 385/25 |
| 7,485,070 | B2 * | 2/2009 | Zhang et al. ................. 475/338 |
| 2007/0019908 | A1 * | 1/2007 | O'Brien et al. ................ 385/36 |

* cited by examiner

*Primary Examiner* — Eric Wong

(57) ABSTRACT

A multi-channel fiber optic rotary joint mechanism has been invented in which optic signals can be transmitted simultaneously from a rotating fiber optic collimator bundle and a stationary fiber optic collimator bundle through an opto-mechanical de-rotating mechanism, which includes an optic de-rotating element, an internal gear and an flexure anti-backlash mechanism. The optic de-rotating element, is positioned in the path between said rotating fiber optic collimator bundle and said stationary fiber optic collimator bundle. The internal gear mechanism provides 2:1 speed ratio for the rotating fiber optic collimator bundle and the optic de-rotating element.

7 Claims, 3 Drawing Sheets

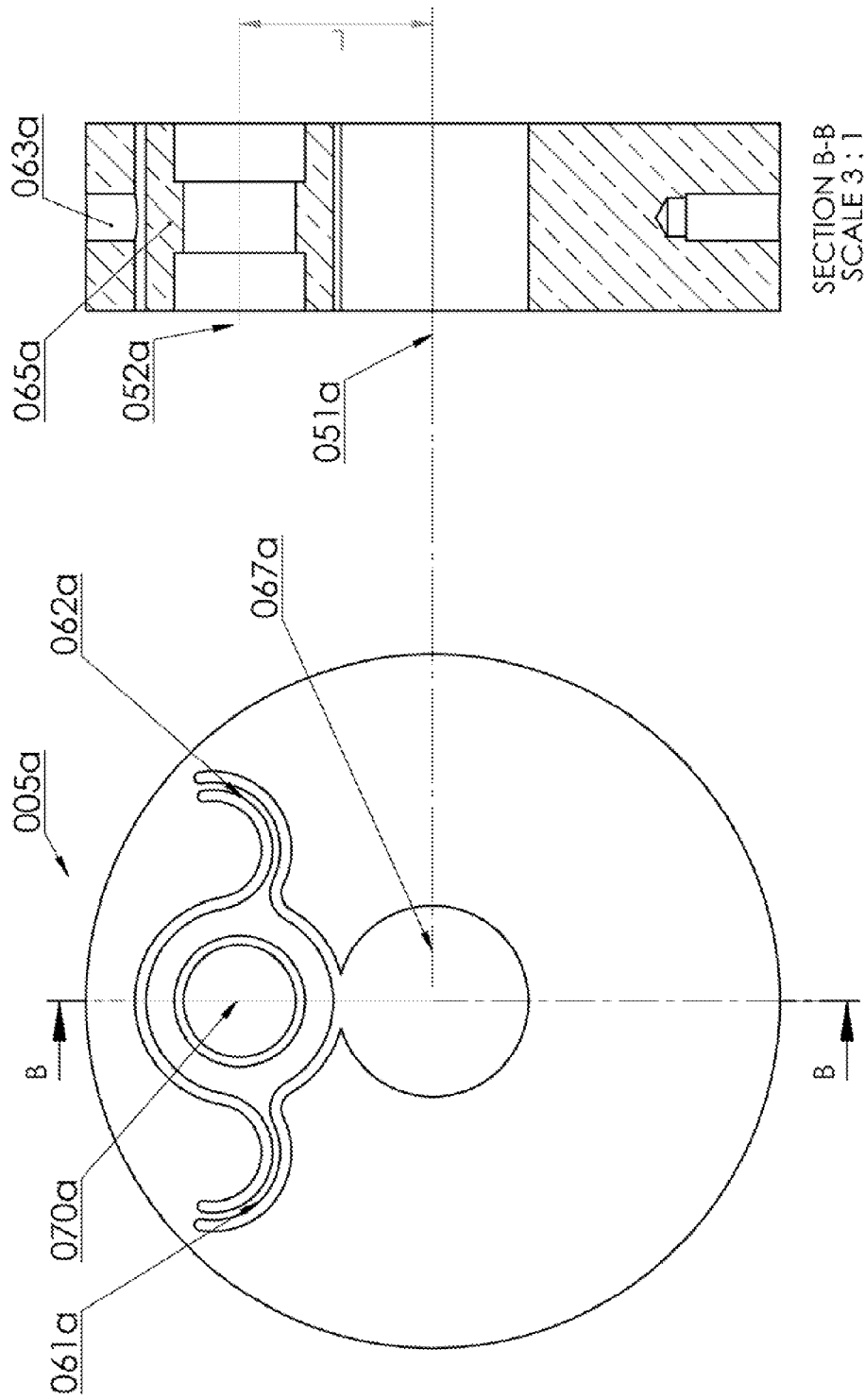

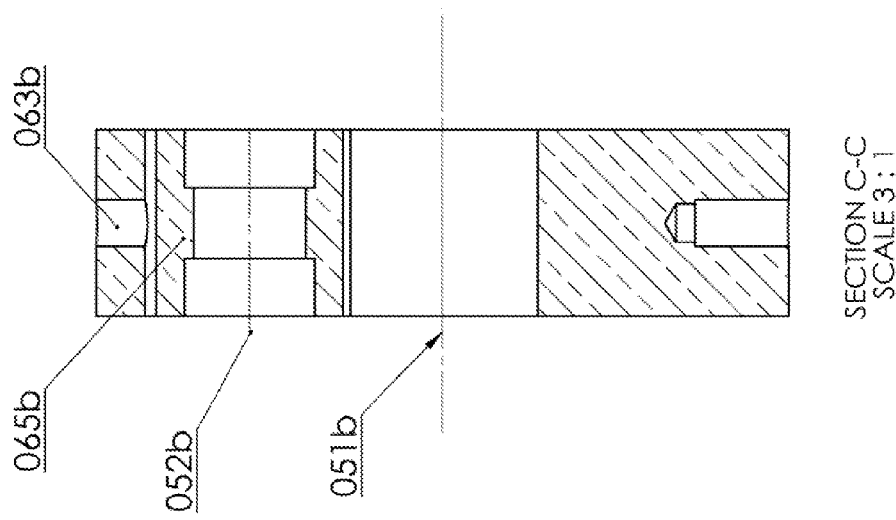
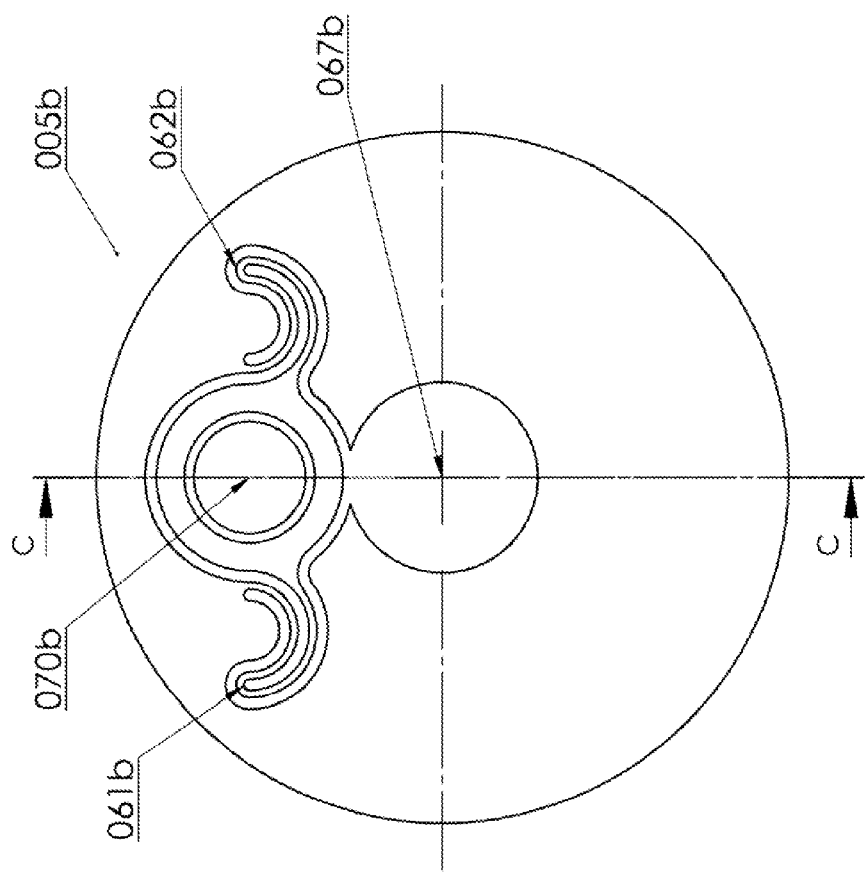
Fig. 3b
Fig. 3a

FIBER OPTIC ROTARY JOINT MECHANISM

BACKGROUND OF THE INVENTION

1. Field of the Invention

The present invention relates generally to the field of apparatus for fiber optic communication, and more particularly, to a multi-channel fiber optic rotary joint using de-rotating mechanism in telecommunication industry.

2. Description of Related Art

A typical fiber optical rotary joint consists of a fixed fiber collimator holder and a rotatable fiber collimator holder which are relatively rotatable each other to allow uninterrupted transmission of optical signals through the rotational interface from fiber collimators on any one of the holders to the fiber collimators on another holder.

The multi-channel fiber optic rotary joints of prior arts typically utilize an opto-mechanical de-rotating mechanism between the fixed fiber collimator holder and the rotatable fiber collimator holder. An opto-mechanical de-rotating mechanism includes an optic de-rotating element, and a mechanical speed change unite. The optic de-rotating element can be Dove prism, Delta prism, Abbe-Konig prism, Schmidt-Pechan prism, and a cylindrical GRIN lens. It rotates at half the speed of rotation of the rotatable fiber collimator holder. The mechanical speed change unite, usually a gear system, provides 2:1 speed ratio for the rotatable fiber collimator holder and the optic de-rotating element.

In a gear system, when two gears mesh each other, there is usually a clearance or backlash between the teeth of two gears due to manufacturing errors and assembly errors. At a reversal transmission, the direction of rotation changes and the output shaft of gear transmission system would turn a slight angle due to the above named clearance, or backlash. That would cause a motion loss, or kinematic transmission error and dynamically also cause noise and vibration. So the anti-backlash mechanism is usually used in gear system.

The examples of the prior arts include U.S. Pat. No. 5,157,745, U.S. Pat. No. 5,371,814, U.S. Pat. No. 5,442,721, and U.S. Pat. No. 6,301,405, where a Dove prism is commonly used as optic de-rotating element.

Variety of gear systems are designed to provides 2:1 speed ratio. Usually one gear is fixed with rotor; another gear fixed with Prism holder, or prism rotor; while other gears engage with the respective gears to transform motion from rotor to prism holder. Like U.S. Pat. No. 5,371,814, a planetary gear subassembly having an internal gear mounted for rotation with the image-derotation-prism, a star gear mounted for rotation with the second lens housing member, and a plurality of planetary gears journalized to the stator between and mechanically ganged with said star gear and said internal ring gear. In U.S. Pat. No. 5,442,721, a two to one gear assembly consists of 4 external gears. Two of them are fixed with rotor and prism holder respectively. The left two gears mounted on a common shaft to connect said gear on rotor and said gear on prism holder. Similarly in U.S. Pat. No. 5,157,745, an internal gear mounted to said first rotor; an external gear mounted to said second, Dove prism holding, rotor; and two drive gears mounted on an axle for connecting said internal gear to said external gear. The anti-backlash mechanism consists of two springs to adjust the position of said axle to allow the drive gears to be held tightly against the respective internal gear and external gear by spring force.

Another kind of anti-backlash mechanism can be seen in U.S. Pat. No. 6,301,405, where more gears and springs are utilized to enable tight engagement of each gear set.

There are at least two common disadvantages in the prior arts: first, many more external gears are used in the gear system than internal gear; second, wire spring, e.g., compression spring or extension spring, are used in the anti-backlash mechanism. Both of them require more space for designed Fiber optic rotary joint, which results in diameter increase of designed Fiber optic rotary joint.

Comparing with external gear, internal gear has many advantages. First, it allows a compact parallel shaft transmission drive. Used with a spur pinion the ratio is the same as that of two external gears, but the center distance is much smaller. Second advantage of internal gear is to reduce sliding action due to a convex profile surface working against a concave surface and as friction results in tooth wear; a reduction in the amount of sliding action is desirable. Another advantage is that internal gear usually provides a higher contact ratio to assure smooth continuous motion transmission. Internal gears also have better load-carrying capacity than external spur gears.

Flexure mechanisms or compliant mechanisms are flexible mechanisms that rely on elastic body deformation to produce motion and transmit forces. These are usually monolithic (single-piece) or jointless structures with certain advantages over the rigid-body, or jointed, mechanisms. The key advantage of flexure mechanisms lies in their simplicity and high precision in the absence of friction and backlash. Since the compliant mechanisms are single-piece structures, there is no need for assembly. With no joints, "rubbing" between two parts or friction as seen at the joints of rigid body mechanisms is absent. They cost less to make than the jointed variety.

SUMMARY OF THE INVENTION

The first object of the present invention is to provide 2:1 speed ratio for multi-channel fiber optic rotary joints by a compact design of an internal gear mechanism.

Another object of the preset invention is to provide an anti-backlash flexure for the internal gear mechanism for multi-channel fiber optic rotary joints.

A further object of the present invention is to increase the accuracy of kinematic transmission and to reduce noise and vibration for multi-channel fiber optic rotary joints.

BRIEF DESCRIPTION OF THE DRAWINGS

FIG. 2a illustrates a longitude view of the first embodiment of the anti-backlash flexure for the internal gear mechanism in the present invention;

FIG. 2b illustrates top cross section view of the first embodiment of the anti-backlash flexure for the internal gear mechanism in the present invention;

FIG. 3a shows a longitude view of the second embodiment of the anti-backlash flexure for the internal gear mechanism in the present invention;

FIG. 3b shows top cross section view of the second embodiment of the anti-backlash flexure for the internal gear mechanism in the present invention.

DETAILED DESCRIPTION OF THE INVENTION

Figure 1:
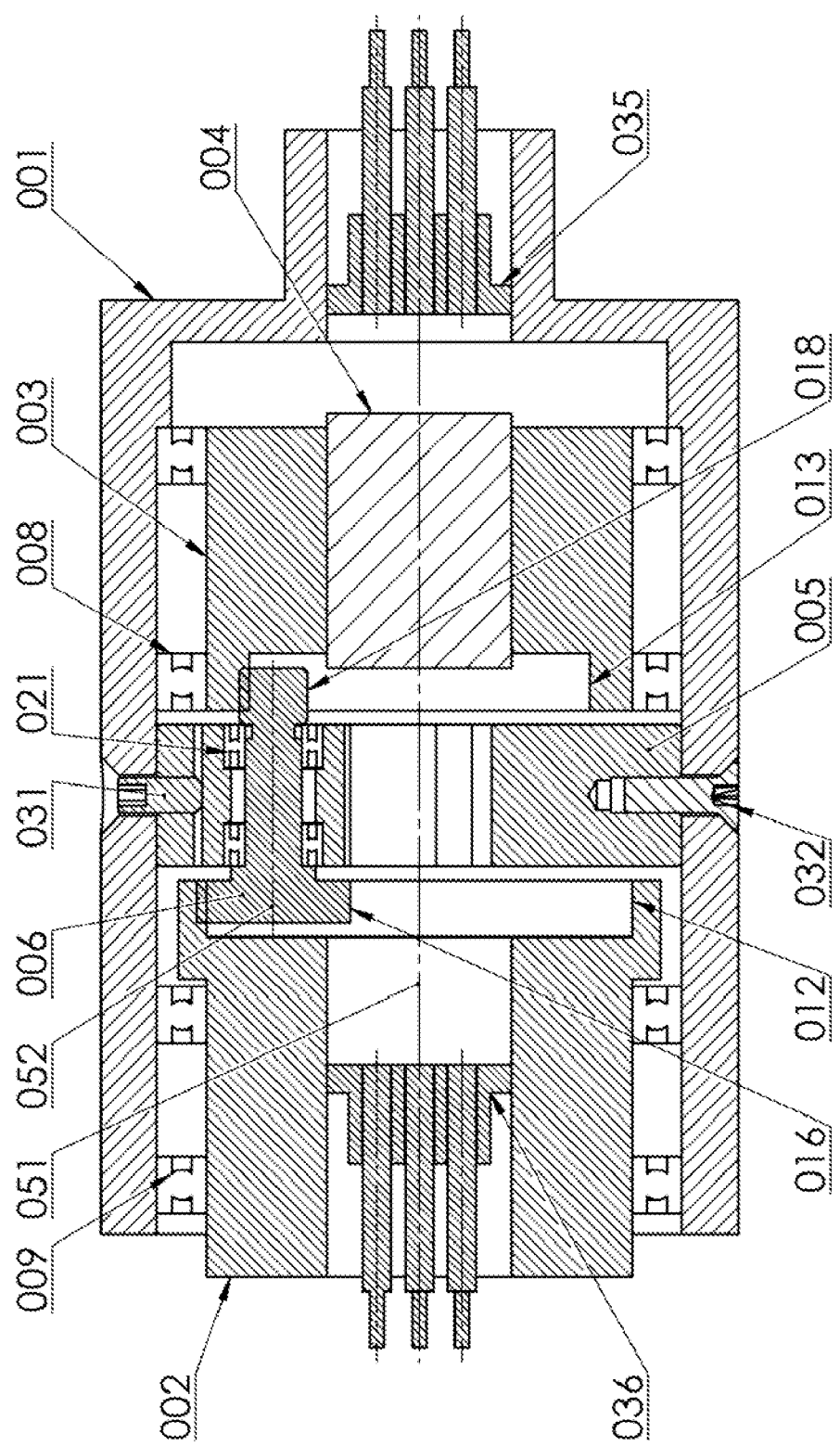
FIG. 1 is a cross-sectional view of a multi-channel fiber optic rotary joint mechanism in the present invention.

Optic de-rotating elements, such as Dove prisms, are used to invert an image and when they are rotated along their longitudinal axis, the transmitted image rotates at twice the rate of the prism. Therefore, if the optic de-rotating element rotates at half the speed of a rotating object, its image after passing through the prism, will appear stationary.

FIG. 1 depicts one of the embodiments of a multi-channel fiber optic rotary joint mechanism in the present invention. It consists of an internal gear mechanism with an anti-backlash flexure 005, an optic de-rotating element 004, and two fiber optic collimator bundles 035 and 036. Said internal gear mechanism includes internal gear 012, internal gear 013, at least one dual gear 006, stationary holder 001, holder 002, holder 003, a pair of bearings 008, a pair of bearings 009, a pair of bearings 021, and anti-backlash flexure 005. Cylindrical-shaped holder 001, 002, and 003 have a common axis 051. Said holder 002 and 003 are rotatable relative to holder 001 by a pair of bearings 008 and a pair of bearings 009. Said fiber optic collimator bundles 035 and 036 are disposed in the central holes of said holder 001 and 002 respectively, face to face. Said optic de-rotating element 004 is positioned in the central hole of holder 003, between fiber optic collimator bundles 035 and 036.

Said internal gear 012 and internal gear 013 are co-axially disposed on one side of said holder 002 and holder 003 respectively. External gear 016 and external gear 018 with a common axis of rotation 052 are fixedly connected each other and combined to form said dual gear 006, which is disposed on said anti-backlash flexure 005 through a pair of bearing 021. Because said anti-backlash flexure 005 is fixed with stationary holder 001 by screw 032, said axis of rotation 052 is stationary too.

Kinematically, said internal gear 012 and internal gear 013 are connected by at least one set of said dual gear 006 to provide 2:1 speed ratio for multi-channel fiber optic rotary joint. The gear ratio i from gear 012 to gear 013 can be determined as follows:

$$i = \frac{Z_{016} Z_{013}}{Z_{012} Z_{018}}$$

where, $Z_{012}$, $Z_{013}$, $Z_{016}$, $Z_{018}$ is the gear teeth number of gear 012, 013, 016 and 018 respectively. If the gear ratio i=2:1, that means the gear 013 will rotate at half the speed of the rotation of gear 012 in the same direction and means that said optic de-rotating element 004 would rotate at half the speed of the rotation of said rotating fiber collimator bundle 036. It will assure that optic signals can be transmitted simultaneously from a rotating fiber optic Collimator bundle 036 and a stationary fiber optic collimator bundle 035.

Said anti-backlash flexure 005 in FIG. 1 could be two different embodiments: 005a in FIG. 2a and FIG. 2b, and 005b in FIG. 3a and FIG. 3b.

In FIG. 2a and FIG. 2b, said anti-backlash flexure 005a is a single-piece structure having a central hole 067a with central axis 051a. An off-centered bearing housing 065a includes two elastic beams 061a and 062a symmetrically on each side. Said elastic beam 061a and 062a are connected with the main body of said anti-backlash flexure 005a. The axis 052a of said bearing housing 065a is parallel with axis 051a. The distance between said axis 051a and 052a is "L". If a force is applied to said bearing housing 065a, it would be movable according to the elastic deformation of its elastic beam 061a and 062a. As shown FIG. 1, a force may be applied by a set screw 031 through the screw hole 063a on the main body of said anti-backlash flexure 005a (FIG. 2b). This would adjust the distance between said axis 051a and 052a, "L", and means that also adjust the clearance, or back lash, in gear meshing between gear 012 and 016, as well as between gear 013 and 018.

Another preferred embodiment of said anti-backlash flexure 005b is shown in FIG. 3a and FIG. 3b. Instead of single elastic beams in FIG. 2a and FIG. 2b, two double-folded elastic beams 061b and 062b are used to support the off-centered bearing housing 065b. Said double-folded elastic beams 061b and 062b may provide more elastic deformation comparing with the single elastic beams 061a and 062a in FIG. 2a and FIG. 2b.

While two preferred embodiments of the invention have been described using specific terms, such description is for illustrative purposes only, and it is to be understood that changes and variations may be made without departing from the spirit or scope of the following claims.

The invention claimed is:

1. A multi-channel fiber optic rotary joint mechanism for optic signal transmissions comprising:
    a first cylindrical-shaped holder with a central hole;
    a second cylindrical-shaped holder with a central hole;
    and a third cylindrical-shaped holder with a central hole;
    said first holder, said second holder and said third holder defining a common axis;
    said first holder and said second holder being rotatable relative to said third holder around said common axis;
    a first fiber optic collimator bundles disposed in the central hole of said first holder;
    a second fiber optic collimator bundles disposed in the central hole of said third holder; and
    an optic de-rotating element positioned in the central hole of said second holder between said first fiber optic collimator bundle and second fiber optic collimator bundle;
    an internal gear mechanism with an anti-backlash flexure, means for providing rotation for said second holder at an rotational rate half the rotational rate of said first holder relative to said third holder.

2. The multi-channel fiber optic rotary joint mechanism according to claim 1, wherein said internal gear mechanism further comprising: a first internal gear, a second internal gear, at least one unit of a dual gear set, and an anti-backlash flexure; and said first internal gear and said second internal gear being co-axially fixed on one side of said first holder and said second holder respectively.

3. The multi-channel fiber optic rotary joint mechanism according to claim 1, wherein said optic de-rotating element means a Dove prism, or a Delta prism, or a Abbe-Konig prism, or a Schmidt-Pechan prism, or a cylindrical GRIN lens, or a pair of cylindrical lens.

4. The internal gear mechanism according to claim 2, wherein said dual gear set including a first external gear and a second external gear with a common axis of rotation, being fixedly connected each other and combined to form said dual gear set; and said dual gear set being disposed on said anti-backlash flexure through a pair of bearings.

5. The internal gear mechanism according to claim 2, wherein said anti-backlash flexure being a single-piece structure having features such as: a central hole with central axis; at least one off-centered bearing housing for providing support for said a pair of bearings; two elastic beams symmetrically connected said bearing housing and the main body of said anti-backlash flexure; the axis of said bearing housing being parallel with said central axis; said anti-backlash flexure being fixed with said third holder with alignment of said central axis and said common axis.

6. The internal gear mechanism according to claim 2, wherein said first internal gear and second internal gear being connected by at least one unit of said dual gear set so that the gear ratio between said first internal gear to second internal gear is 2:1.

7. The anti-backlash flexure according to claim 5, wherein said two elastic beams for supporting said anti-backlash flexure could be a single elastic beam, or a double-folded elastic beam, or a multi-folded elastic beam.

* * * * *